United States Patent [19]

Garnjost et al.

[11] Patent Number: 5,473,698

[45] Date of Patent: Dec. 5, 1995

[54] METHOD OF CONTROLLING THE APPLICATION OF COUNTER-VIBRATION TO A STRUCTURE

[76] Inventors: Kenneth D. Garnjost, 201 Admiral's Walk, Buffalo; Gonzolo J. Rey, 7 Naramore Dr., Batavia, both of N.Y. 14202

[21] Appl. No.: 156,013

[22] Filed: Nov. 23, 1993

[51] Int. Cl.[6] .................................................. G06K 11/16
[52] U.S. Cl. .................................................. 381/71; 381/86
[58] Field of Search .................................. 381/71, 94, 86

[56] References Cited

U.S. PATENT DOCUMENTS

| | | | |
|---|---|---|---|
| 5,146,505 | 9/1992 | Pfaff et al. | 381/71 |
| 5,192,918 | 3/1993 | Sugiyama | 381/71 |
| 5,222,148 | 6/1993 | Yuan | 381/71 |
| 5,267,321 | 11/1993 | Langberg | 381/71 |
| 5,271,062 | 12/1993 | Sugita et al. | 381/71 |
| 5,293,425 | 3/1994 | Oppenheim et al. | 381/71 |

*Primary Examiner*—Stephen Brinich
*Attorney, Agent, or Firm*—Phillips, Lytle, Hitchcock, Blaine & Huber

[57] ABSTRACT

A method of controlling the application of counter-vibration to a structure (20) so as to reduce the effect of externally-created sinusoidal vibration thereon includes the steps of: mounting a vibratory force generator (19) on the structure; mounting an accelerometer (21) on the structure at a point at which vibration is to be measured; providing a tunable filter (16) capable of resonating at an electrically-controllable frequency; providing an adaptive frequency estimator (22) arranged to produce a tuning signal ($\theta$) as a function of the accelerometer output signal (a); supplying the tuning signal and accelerometer output signal to the filter; continuously adjusting the resonant frequency of the filter so as to equal the frequency of the accelerometer output signal so that the accelerometer output signal will be greatly amplified at the filter output; and supplying the filter output signal as an electrical command signal (y) to the force generator; thereby to cause the vibratory force generator to apply counter-vibrations to the structure to reduce the effect of the externally-created vibrations at the measurement point.

6 Claims, 2 Drawing Sheets

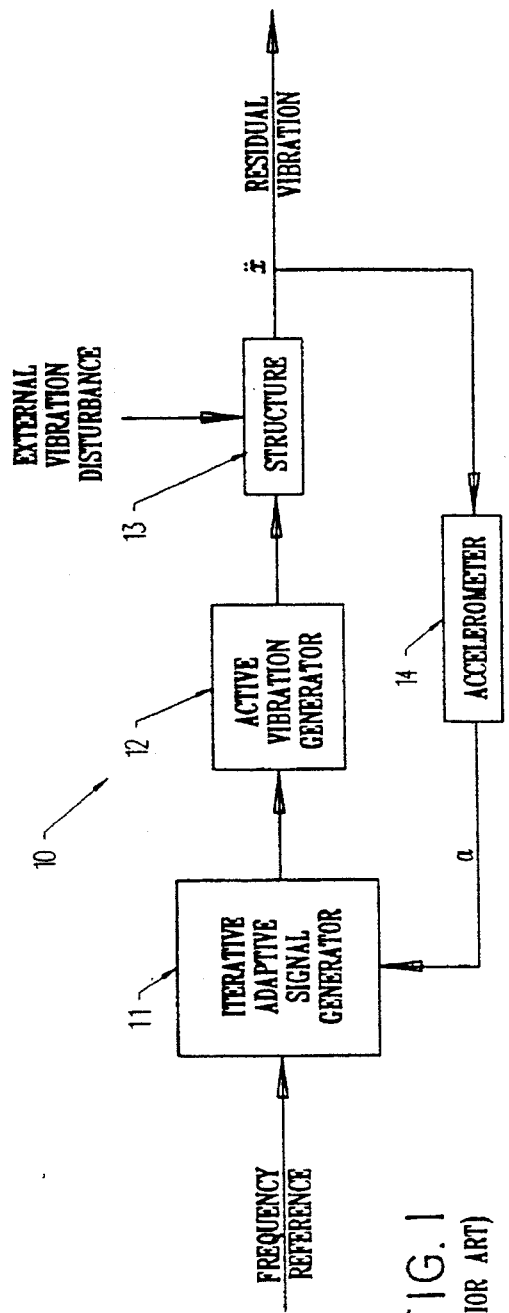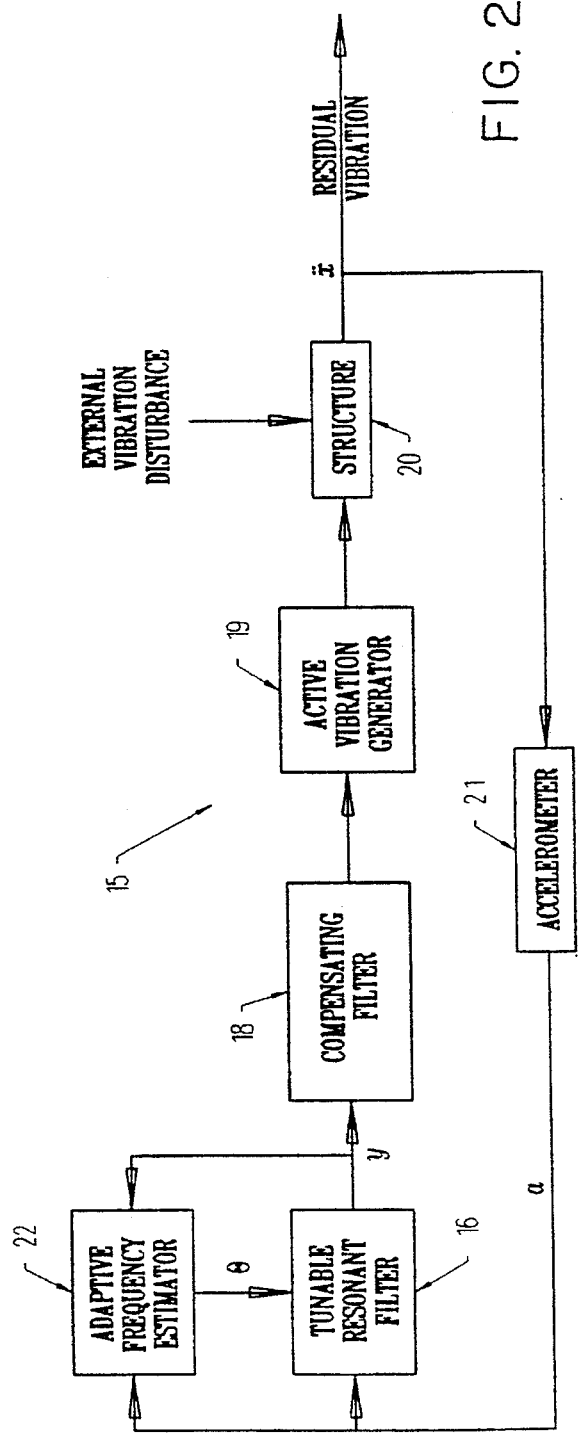

5,473,698

METHOD OF CONTROLLING THE APPLICATION OF COUNTER-VIBRATION TO A STRUCTURE

TECHNICAL FIELD

The present invention relates generally to the field of active vibration cancellation, and, more particularly, to adaptive control of a servo-vibrator mounted on a structure to reduce the effect of externally-created sinusoidal vibrations on the structure at a point of measurement.

BACKGROUND ART

It is known to introduce counter-vibrations into a structure to oppose and cancel external disturbance vibrations therein, to achieve net vibration reduction in the structure. This has been implemented by various control methods. See, e.g., U.S. Pat. No. 4,122,303 ("Improvements In And Relating To Active Sound Attenuation"); U.S. Pat. No. 4,153,815 ("Active Attenuation Of Recurring Sounds"); U.S. Pat. No. 4,417,098 ("Method Of Reducing The Adaptation Time In The Cancellation Of Repetitive Vibration"); U.S. Pat. No. 4,489,441 ("Method And Apparatus For Cancelling Vibration"); U.S. Pat. No. 4,490,841 ("Method And Apparatus For Cancelling Vibrations"); and U.S. Pat. No. 4,819,182 ("Method And Apparatus For Reducing Vibrations Of A Helicopter Fuselage").

If the external disturbance is sinusoidal, the solutions suggested by the prior art have generally attempted to synthesize a similar sinusoidal signal having the same frequency as the external vibration, which signal is subsequently adjusted in phase and amplitude by amounts that are adaptively estimated from the sensed residual vibration in the structure. The synthesized signal is then fed as a command to a vibratory force generator, the output of which is applied to oppose and cancel the sensed vibration in the structure. For such a scheme to be practical, it is necessary to synchronize the sinewave generator in frequency and/or time with the sensed vibration. In a typical implementation with an engine serving as the vibration source, an engine RPM signal or crankshaft position information is used to provide the needed frequency reference.

The iteratively-adaptive algorithms in the above patents are capable of controlling any type of periodic vibration, even those that are not sinusoidal. The vibration control system in the '182 patent, supra, is also aimed at a multi-sensor, multi-actuator vibration control problem. The complexity of such prior art solutions has required relatively-powerful digital computers for their implementation.

Another prior art solution, Val, Gregory and Gupta, "Design And Evaluation of a State-Feedback Vibration Controller", *Journal of American Helicopter Society*, 29:4 (July 1984), presents a continuous linear analog controller approach to the vibration cancellation problem based on modern state-feedback control theory. However, it is time-invariant, and therefore lacks frequency tracking capability.

DISCLOSURE OF THE INVENTION

With parenthetical reference to the corresponding parts, portions or surfaces of the disclosed embodiment, merely for purposes of illustration, not by way of limitation, the invention broadly provides an improved method of controlling the application of counter-vibrations to a structure (20) so as to reduce the effect of externally-created sinusoidal vibration thereon. The improved method broadly comprises the steps of: mounting a vibratory force generator (19) on the structure, the force generator being capable of applying sinusoidal counter-vibrations to the structure in response to a supplied electrical signal; mounting an accelerometer (21) on the structure at a point at which vibration is to be measured, the accelerometer being arranged to produce an output signal (a) having an amplitude, phase and frequency in response to the sensed vibration ($\ddot{x}$); providing a tunable filter (16) capable of resonating at an electrically-controllable frequency; providing an adaptive frequency estimator (22) arranged to produce a tuning signal ($\theta$) as a function of the accelerometer output signal; supplying the estimator tuning signal to the filter; supplying the accelerometer output signal to the filter; continuously adjusting the resonant frequency of the filter so as to equal the frequency of the accelerometer output signal so that the accelerometer output signal will be greatly amplified at the output of the filter; and supplying the resonant filter output signal as an electrical command signal (y) to the force generator; thereby to cause the force generator to apply counter-vibrations to the structure to reduce the effect of externally-created vibrations at the measurement point.

If desired, the filter output signal may be supplied to a compensating filter (18) which approximates the inverse of the dynamic response of the vibratory force generator and the structure.

Accordingly, the general object of the general is to provide an improved method of controlling the application of counter-vibrations to a structure.

Another object is to provide an improved method of controlling the application of counter-vibrations to a structure, in such a manner that counter-vibrations may be caused to track frequency variations in the disturbance vibrations.

Still another object is to provide an improved and low-cost method of controlling the application of counter-vibrations to a structure.

These and other objects and advantages will become apparent from the foregoing and ongoing written specification, the drawings, and the appended claims.

BRIEF DESCRIPTION OF THE DRAWINGS

FIG. 1 is a schematic block diagram of a prior art control system for an active vibration generator.

FIG. 2 is a schematic block diagram of an improved control system for an active vibration generator.

DESCRIPTION OF THE PREFERRED EMBODIMENTS

Figure 3:
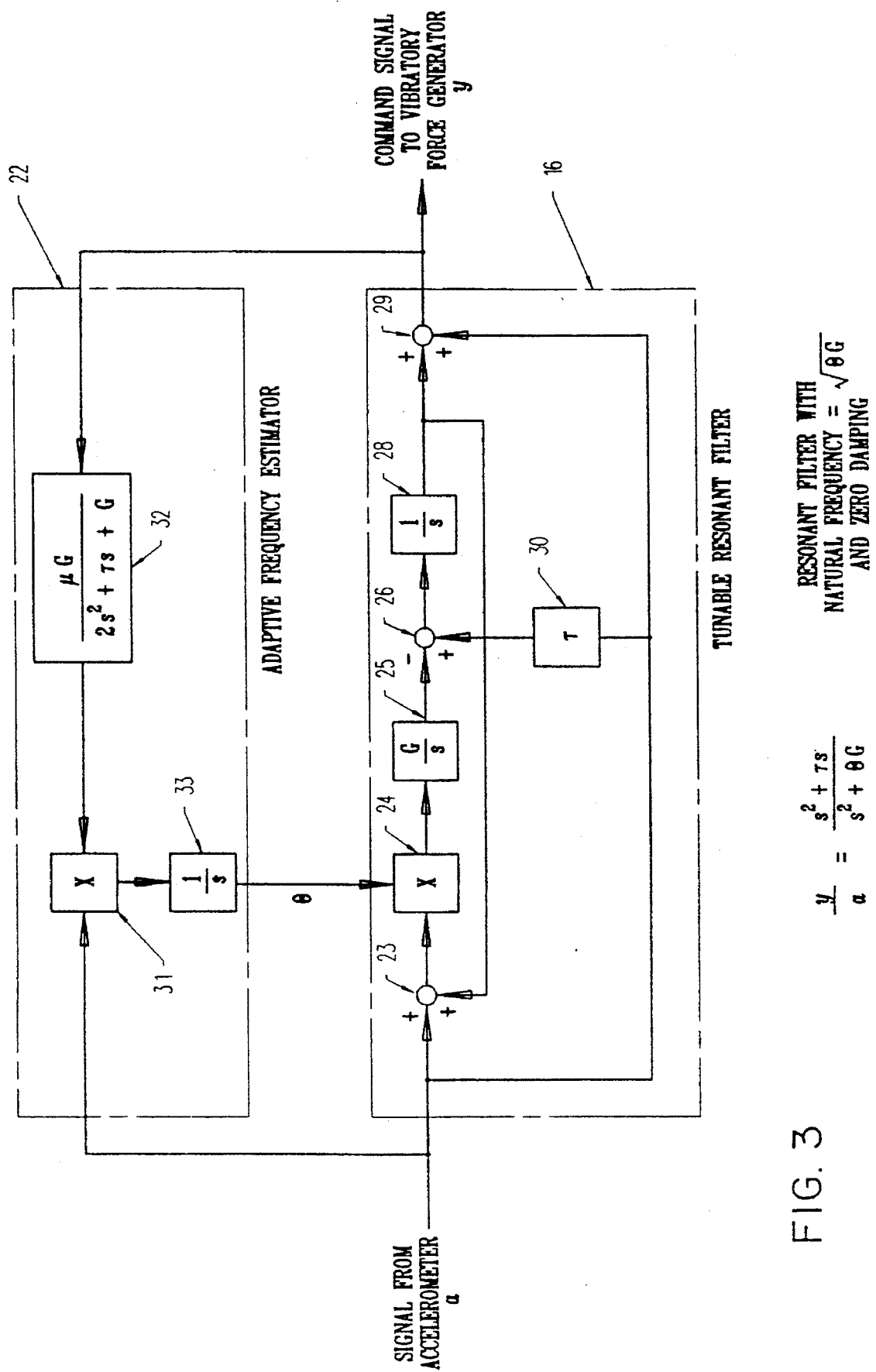
FIG. 3 is a block diagram of the adaptive frequency estimator and the trundle resonant filter shown in FIG. 2.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and. adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Prior Art Control System (FIG. 1)

Referring now to the drawings, FIG. 1 depicts a conventional prior art arrangement for controlling the application of counter-vibrations to a structure. In FIG. 1, the prior art control scheme, generally indicated at 10, is shown as having an input frequency reference supplied to an iterative adaptive signal generator 11. The signal generator provided a synthesized sinusoidal output signal, which was supplied to an active vibration generator 12, which, in turn, applied counter-vibrations to a structure 13. The applied counter-vibrations were summed with the external vibration disturbance in the structure. The resulting residual acceleration (37) was sensed by an accelerometer 14. The output signal (a) of the accelerometer was supplied to signal generator 11. Thus, the prior art arrangement shown in FIG. 1 required a frequency reference input signal. This was typically provided in the form of an engine RPM signal, or in the form of crankshaft angular position information.

Improved Control System (FIGS. 2-3)

Referring now to FIGS. 2-3, the improved control scheme, generally indicated at 15, is shown as broadly including a tunable resonant filter 16. The output of this filter is supplied to a compensating filter 18 which, in turn, supplies its output to an active vibration generator 19. Vibration generator 19 applies a counter-vibration to a structure 20, which is subjected to external vibration disturbance. The residual vibration ($\ddot{x}$) in the structure is sensed by an accelerometer 21, which supplies its output signal (a) to resonant filter 16 and to an adaptive frequency estimator 22. The filter output signal (y) is also supplied to estimator 22 which provides a tuning signal $\theta$ to the resonant filter.

FIG. 3 is a block diagram of the adaptive frequency estimator and the tunable resonant filter shown in FIG. 2. In FIG. 3, the signal a from accelerometer 21 is shown as being provided as a positive input to a summing point 23. The output of this summing point is provided to a multiplier 24, the output of which is in turn provided to an integrator having a gain G, this integrator being represented in block 25. The output of integrator 25 is provided as a negative input to summing point 26. The output of summing point 26 is further integrated, as indicated by block 28, and is provided as a positive input to a summing point 29. The output (y) of summing point 29 is provided as a command signal to the vibratory force generator through compensating filter 18, as shown in FIG. 2.

The accelerometer signal a is also fed forward as a positive input to summing point 29. The accelerometer signal a is also multiplied by a gain of $\tau$, and their product is supplied as a positive input to middle summing point 26. The output of integrator 28 is supplied as a positive feedback signal to summing point 23.

The accelerometer signal a is also supplied to a multiplier 31 in the frequency estimator. This multiplier is also provided with signal y through a gain block represented at 32. As indicated in FIG. 3, the gain of block 32 is:

$$\text{gain} = \frac{\mu G}{2s^2 + \tau s + G}$$

Multiplier 31 computes the product of accelerometer signal a and the output of gain block 32, and supplies it as an output to gain block 33, which integrates such signal to produce a tuning signal $\theta$, which is, in turn, supplied to filter multiplier 24. Thus, for a natural frequency of $f_n = (\theta G)^{1/2}$ and zero damping, the transfer function of the resonant filter is:

$$\frac{y}{a} = \frac{s^2 + \tau s}{s^2 + \theta G}$$

Therefore, in operation, an external vibration disturbance acts on the structure to produce a vibration level at a sensed control point in the structure. The vibration in the structure at such control point is sensed by accelerometer 21. The accelerometer produces an output signal a, which is supplied to both the tunable resonant filter 16 and to the adaptive frequency estimator 22. Assuming that the disturbance vibration is sinusoidal and has a frequency $f_d$, and a significantly-different initial frequency $f_{ri}$ of the tunable filter, there will be essentially no initial output from the tunable filter. The adaptive frequency estimator can be implemented in a variety of ways known to those skilled in the art, but, in any event, acts to produce a tuning signal $\theta$, which is supplied to the tunable filter so that the filter output becomes as large as possible for a given input from the accelerometer. Thus, the filter tuning will be shifted such that its tuned resonant frequency $f_{rt}$ becomes equal to the disturbance frequency $f_d$. The accelerometer signal a will thus be greatly amplified by the resonant filter to provide a drive signal to the active vibration generator 19 so as to apply counter-vibrations to the structure, which, in turn, will tend to oppose and cancel the disturbance, and hence the measured vibration. The adaptive algorithm contains an effective integration so that, as the residual structural vibration is driven toward zero, there will still be a tuning signal of non-zero finite value to hold the tuning of the resonant filter at its optimum value, equal to the disturbing frequency.

Practical implementation of the control functions disclosed can be accomplished by analog electronic signal processing. The tunable resonant filter requires only two integrators and a non-linear multiplier, while the adaptive frequency estimator can be provided by three integrators and a multiplier. Both of these functions may also be implemented with equally-simple digital signal processing.

The compensator 18 may optionally be required if the transfer function from the vibration generator command signal to the resulting vibration of the structure at the acceleration measuring point contains significant dynamic effects due either to structural resonance or lags associated with the vibration generator. In such a case, the compensator may be ideally implemented as a transfer function which is the approximate inverse of the vibrator/structure response in the frequency range of interest. However, this compensation is not critical. For appropriately chosen gain parameter values, the compensator phase characteristic can deviated significantly from the ideal, since the adaptive tuning process can introduce significant signal phase correction by slight detuning of the filter.

Modifications

Persons skilled in this art will readily appreciate that many possible modifications may be made. For example, the disclosed method may be used for the suppression of noise in a sound-conducting medium. In this arrangement, the accelerometer would be replaced by a microphone, and the vibration generator would be replaced by a sound generator or loud speaker. Similarly, the implementation of the controlled electronics may be partially-analog and partially-digital, and the robustness or responsiveness of the process may be modified by more complex adaptive elements.

Therefore, while a preferred way or practicing the improved method has been shown and described, and several modifications thereof discussed, persons skilled in this art will readily appreciate that various additional changes and modifications may be made without departing from the spirit of the invention, as defined and differentiated by the following claims.

What is claimed is:

1. The method of controlling the application of counter-vibration to a structure so as to reduce the effect of externally-created sinusoidal vibration thereon, comprising the steps of:

mounting a vibratory force generator on said structure for applying sinusoidal counter-vibrations to said structure in response to a supplied electrical signal;

mounting an accelerometer on said structure at a point at which vibration is to be measured, said accelerometer being arranged to produce an output signal having an amplitude, phase and frequency in response to a sensed vibration;

providing a tunable filter capable of resonating at an electrically-controllable frequency;

providing an adaptive frequency estimator arranged to produce a tuning signal as a function of said accelerometer output signal;

supplying said tuning signal to said filter;

supplying said accelerometer output signal to said filter;

continuously adjusting the resonant frequency of said filter so as to equal the frequency of said accelerometer output signal so that said accelerometer output signal will be greatly amplified at the output of said filter; and supplying said resonant filter output signal as an electrical command output signal to said force generator;

thereby to cause said vibratory force generator to apply counter-vibrations to said structure to reduce the effect of externally-created vibrations at such measurement point.

2. The method as set forth in claim 1 and further comprising the additional step of:

supplying said filter output signal through a compensating filter which approximates the inverse of the dynamic response of the vibratory force generator and structure.

3. The method as set forth in claim 1 wherein an accelerometer is mounted on said structure at substantially the same point as said vibratory force generator.

4. The method of controlling the application of counter-noise to a structure so as to reduce the effect of externally-created sinusoidal noise thereon, comprising the steps of:

mounting a sound generator on said structure for applying sinusoidal counter-noise to said structure in response to a supplied electrical signal;

mounting a microphone on said structure at a point at which noise is to be measured, said microphone being arranged to produce an output signal having an amplitude, phase and frequency in response to a sensed noise;

providing a tunable filter capable of resonating at an electrically-controllable frequency;

providing an adaptive frequency estimator arranged to produce a tuning signal as a function of said microphone output signal;

supplying said tuning signal to said filter;

supplying said microphone output signal to said filter;

continuously adjusting the resonant frequency of said filter so as to equal the frequency of said microphone output signal so that said microphone output signal will be greatly amplified at the output of said filter; and supplying said resonant filter output signal as an electrical command signal to said sound generator;

thereby to cause said sound generator to apply counter-vibrations to said structure to reduce the effect of externally-created vibrations at such measurement point.

5. The method as set forth in claim 4 and further comprising the additional step of:

supplying said filter output signal through a compensating filter which approximates the inverse of the dynamic response of the sound generator and structure.

6. The method as set forth in claim 4 wherein a microphone is mounted on said structure at substantially the same point as said sound generator.

* * * * *

UNITED STATES PATENT AND TRADEMARK OFFICE
CERTIFICATE OF CORRECTION

PATENT NO. : 5,473,698
DATED : December 5, 1995
INVENTOR(S) : Kenneth D. Garnjost, et. al.

It is certified that error appears in the above-indentified patent and that said Letters Patent is hereby corrected as shown below:

Title page, item [76]

The name of the second inventor "Gonzolo J. Rey" should be

— Gonzalo J. Rey —.

Signed and Sealed this

Second Day of July, 1996

Attest:

BRUCE LEHMAN

Attesting Officer

Commissioner of Patents and Trademarks